Aug. 16, 1932. W. T. GRAHAM 1,872,276
APPARATUS FOR AND METHOD OF FORMING TUBULAR BLANKS
Filed Feb. 24, 1930
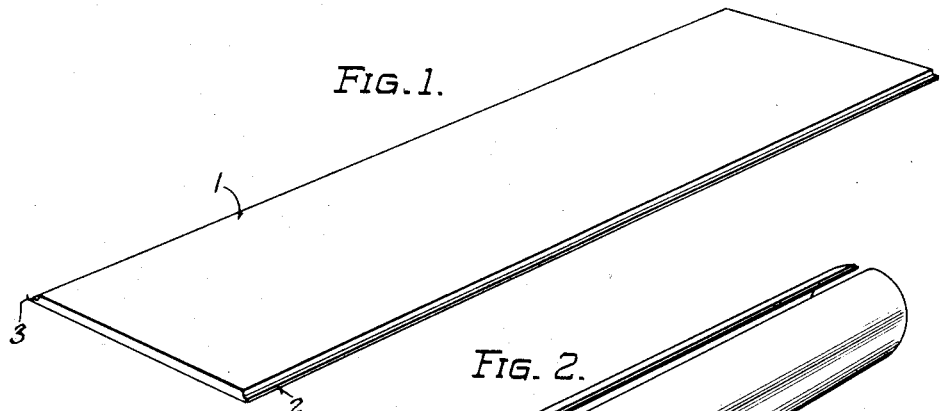
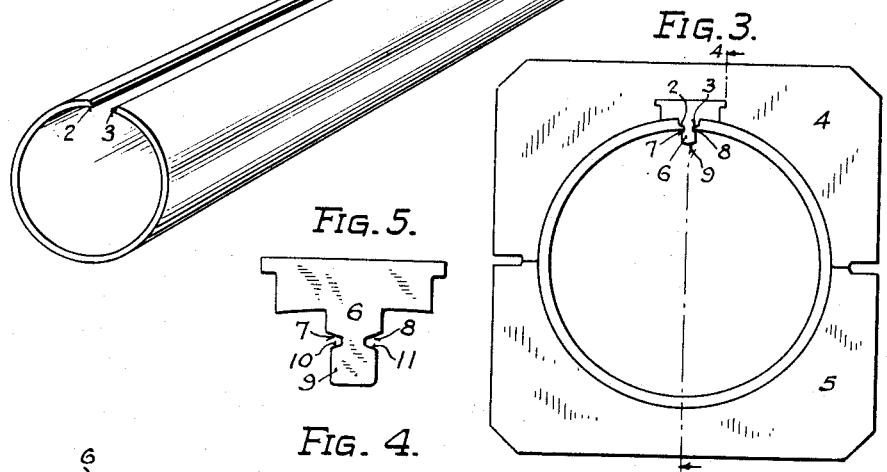
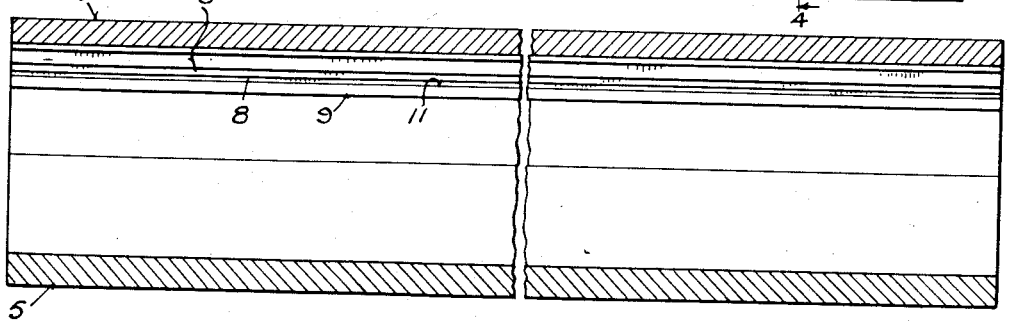
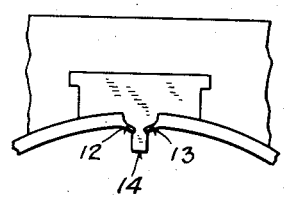
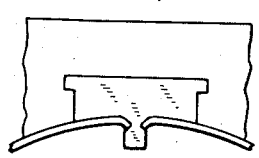
INVENTOR.
William T. Graham
BY
ATTORNEY.

Patented Aug. 16, 1932

1,872,276

UNITED STATES PATENT OFFICE

WILLIAM T. GRAHAM, OF MILWAUKEE, WISCONSIN, ASSIGNOR TO A. O. SMITH CORPORATION, OF MILWAUKEE, WISCONSIN, A CORPORATION OF NEW YORK

APPARATUS FOR AND METHOD OF FORMING TUBULAR BLANKS

Application filed February 24, 1930. Serial No. 430,814.

The invention relates to the manufacture of welded tubular articles and particularly to the forming of the tubular blank preparatory to electrically welding a longitudinal seam therein.

In forming a tubular blank preparatory to arc welding the same, it has been found convenient to scarf the longitudinal edges of a flat strip of metal to provide outwardly extending lips of reduced wall thickness which form the base of the welding groove when the sheet has been converted into tubular form. During the final forming operation, however, the lips are often destroyed and disfigured which necessitates rejecting the blank or refinishing the edges.

The object of the present invention is to provide a support for the lips during the final forming operation to preserve the same.

A further object of the invention is to provide the final forming dies with means for shaping the lips to form the desired welding groove.

A further object of the invention is to provide the final forming dies with means for forming or shaping the edges to be welded to provide a welding groove therebetween.

Further objects of the invention will become apparent from the following description taken in connection with the accompanying drawing.

In the drawing:

Fig. 1 illustrates in perspective a flat strip of metal which is to be converted into a tubular blank and showing the longitudinal edges having outwardly extending lips.

Fig. 2 shows the metal sheet converted into a substantially tubular form with the edges spaced from each other a substantial distance.

Fig. 3 illustrates diagrammatically an end view of the final forming dies for converting the blank shown in Fig. 2 into a finished tubular blank which is ready for the final welding operation.

Fig. 4 is a section through the forming dies taken on the line 4—4 of Fig. 3.

Fig. 5 is an enlarged end view of the tongue.

Fig. 6 illustrates a modification of the forming dies shown in Fig. 3.

Fig. 7 illustrates a further modification of the invention.

Referring to the drawing, Fig. 1 shows a flat metal blank 1 having its longitudinal edges scarfed or planed to provide outwardly extending lips or projections 2 and 3 extending longitudinaly for the full length of the blank.

Fig. 2 shows the same blank which has been converted into a substantially tubular shape in any desired manner such as by pressing, stamping or rolling.

The blank thus formed is next inserted between the final forming dies 4 and 5, as shown in Fig. 3. The dies are of complemental semi-cylindrical contour and are adapted to size and true the blank in one operation.

The upper die 4 is provided for its full length with a downwardly extending projection or tongue 6 which is adapted to be received between the edges of the tubular blank and which forms an abutment against which the edges are pressed when the final forming pressures are exerted.

After the blank is inserted between the forming dies 4 and 5 with the tongue 6 interposed between the longitudinal edges of the blank, the dies are closed toward each other under pressure to confine the blank and flow the metal thereof to thereby permanently true the blank to a cylindrical shape with the edges to be welded parallel to the longitudinal axis of the blank. During this operation, the longitudinal edges of the blank are abutted against the tongue 6 and thereby straightened and made parallel to each other.

In order to prevent destruction of the lips 2 and 3, the side walls of the tongue 6 are of angular character having recesses 7 and 8 for receiving the lips 2 and 3, respectively, of the tubular blank and for supporting the same against collapse. The recesses 7 and 8 are preferably of such shape as to relieve the lips of the major portion of the pressure applied to flow the metal of the blank radially, although the tongue may be of any desired configuration to effect the shaping and supporting of the edges.

As shown in Fig. 5, the tongue is provided with an enlarged end portion 9 forming shoulders 10 and 11, for supporting the scarfed edges of the tubular blank against inward collapse.

In Fig. 6, the tongue is of a configuration to bend the lips downwardly or inwardly so that the welding groove provided has the lips meeting below the lower plane of the sheet and has a depth equal to the thickness of the sheet. To this end, the tongue is provided with downwardly inclined shoulders 12 and 13 and an enlarged end portion 14.

Fig. 7 shows a suitably shaped tongue for bending the edges of a thin tubular blank to form a welding groove above the same.

After the blank thus formed is removed from the forming dies, it is preferably next inserted into a tack welding machine which forces the edges into abutment and tack welds the same in the desired position. After the edges are thus tacked together, the blank is next passed to a welding machine which deposits metal from a fusible weldrod into the welding groove and finally converts the tubular blank into a finished welded tubular article.

Various modifications of the invention may be employed within the scope of the accompanying claims.

I claim:

1. In an apparatus for converting a tubular blank, having the longitudinal edges thereof in spaced relation, into a finished true tubular blank with the edges prepared for arc welding, comprising cooperating dies adapted to be operated to form the blank into a true finished shape, and an inwardly extending projection on one of the dies adapted to be interposed between the longitudinal edges, said projection having horizontal longitudinal sections of different wall thickness.

2. In an apparatus for truing and finishing a tubular blank preparatory to the welding operation, cooperating die members adapted to be operated to form a rough tubular blank into a true finished tubular blank, and an inwardly extending tongue on one of the die members adapted to be interposed between the longitudinal edges of the blank, said tongue having angular side walls.

3. In an apparatus for sizing and truing a tubular blank preparatory to the arc welding operation, cooperating die members adapted to be operated to form a rough tubular blank into a true finished tubular blank, and an inwardly extending tongue on one of the die members adapted to be interposed between the longitudinal edges of the blank, said tongue having oppositely disposed longitudinal recesses for receiving and supporting the edges to be welded.

4. In an apparatus for truing a tubular blank preparatory to arc welding the longitudinal edges thereof, cooperating die members adapted to be operated to form the blank into true finished shape, and an inwardly extending tongue on one of the die members adapted to be interposed between the longitudinal edges of the blank, said tongue having longitudinally extending shoulders for supporting the edges to be welded during the forming operation.

5. In an apparatus for finishing a tubular blank having longitudinal edges to be welded preparatory to the arc welding operation, cooperating die members adapted to be operated to form the blank into a true finished shape, and an inwardly extending tongue adapted to be interposed between the edges to be welded, said tongue having longitudinally extending shoulders for supporting the edges to be welded during the forming operation and said shoulders having inclined side walls.

6. In an apparatus for finishing a tubular blank, having longitudinal edges to be welded, preparatory to welding, cooperating die members adapted to be operated to form the blank into a finished shape, an inwardly extending tongue on one of the die members adapted to be interposed between the edges to be welded, said tongue having oppositely disposed recesses for receiving and supporting the edges to be welded, and inclined walls bordering the recesses.

7. In a method of truing a tubular blank, having its longitudinal edges scarfed to provide projecting lips, preparatory to welding, forming the blank into a finished tubular shape with the longitudinal edges extending in a parallel relation, and supporting and preserving the scarfed edges and lips of the blank during the forming operation.

8. The method of forming a tubular blank which comprises scarfing the longitudinal edges thereof to provide projecting lips, forming the blank into approximately cylindrical shape to bring the edges into parallel spaced relation, and finally forming the blank into finished cylindrical shape with the longitudinal edges extending in closely adjacent parallel relation while supporting and preserving the scarfed edges and lips of the blank.

9. The method of truing a tubular blank having its longitudinal edges scarfed to provide projecting lips which comprises, forming the blank into finished tubular shape with the longitudinal edges extending in parallel relation and simultaneously bending the lips inwardly during the forming operation.

In witness whereof, I have hereunto subscribed my name at Milwaukee, Wisconsin, this 21st day of February, 1930.

WILLIAM T. GRAHAM.